Figure 1:
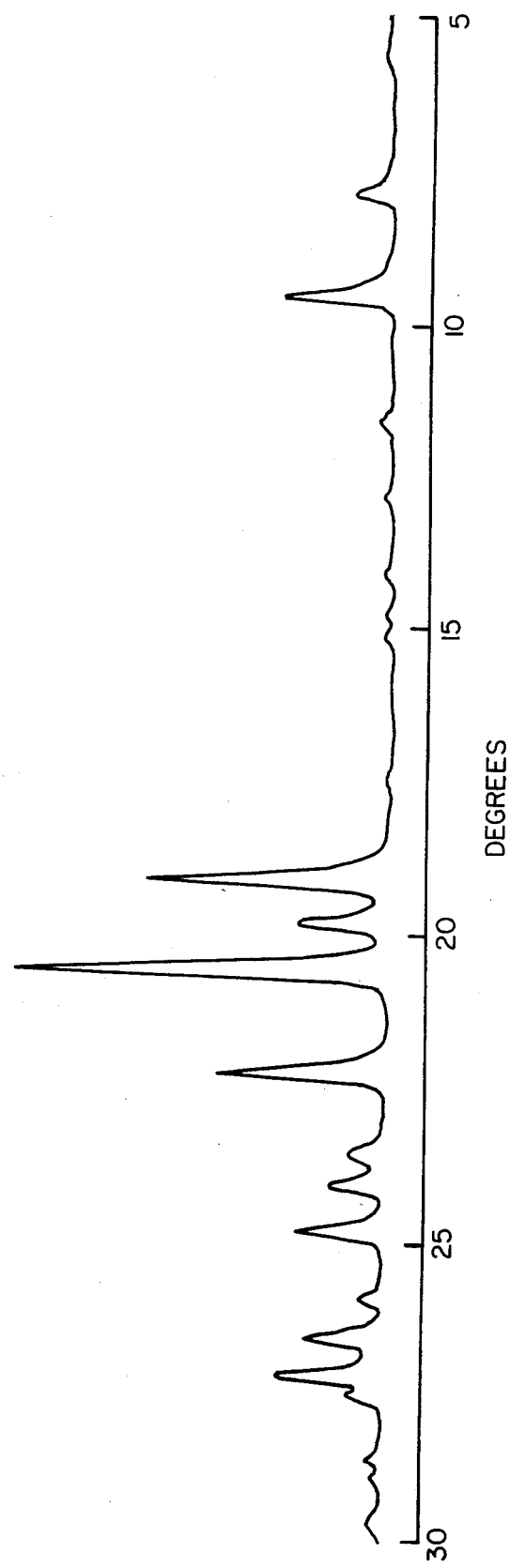

United States Patent [19]

Zones

[11] Patent Number: 4,610,854
[45] Date of Patent: Sep. 9, 1986

[54] ZEOLITE SSZ-15 AND PROCESS FOR PREPARING THE SAME

[75] Inventor: Stacey I. Zones, San Francisco, Calif.

[73] Assignee: Chevron Research Company, San Francisco, Calif.

[21] Appl. No.: 437,709

[22] Filed: Oct. 29, 1982

[51] Int. Cl.[4] .................................. C01B 33/20
[52] U.S. Cl. ............................. 423/326; 423/328; 423/329; 502/60; 502/61; 502/77
[58] Field of Search ............ 252/431 N, 455 Z; 423/326, 328, 329; 502/77

[56] References Cited

U.S. PATENT DOCUMENTS

| | | | |
|---|---|---|---|
| 3,699,139 | 10/1972 | Rubin et al. | 423/329 |
| 4,086,186 | 4/1978 | Rubin et al. | 423/328 |
| 4,287,166 | 9/1981 | Dwyer et al. | 423/329 |
| 4,427,789 | 1/1984 | Miale et al. | 423/328 |
| 4,528,171 | 7/1985 | Casci et al. | 423/277 |

FOREIGN PATENT DOCUMENTS

| | | | |
|---|---|---|---|
| 0042226 | 12/1981 | European Pat. Off. | 252/455 Z |
| 0063436A1 | 10/1982 | European Pat. Off. | 423/328 |

*Primary Examiner*—John Doll
*Assistant Examiner*—Jackson Leeds
*Attorney, Agent, or Firm*—S. R. LaPaglia; W. K. Turner; V. J. Cavalieri

[57] ABSTRACT

A crystalline zeolite, SSZ-15, is prepared from cyclopentyl trimethylammonium and cyclohexyl trimethylammonium cations.

3 Claims, 1 Drawing Figure

X-RAY DIFFRACTION PATTERN OF SSZ-15

DEGREES

X-RAY DIFFRACTION PATTERN OF SSZ-15

ZEOLITE SSZ-15 AND PROCESS FOR PREPARING THE SAME

TECHNICAL FIELD

Natural and synthetic aluminosilicates are important and useful compositions. Many of these aluminosilicates are porous and have definite, distinct crystal structures as determined by X-ray diffraction. Within the crystals are a large number of cavities and pores whose dimensions and shapes vary from zeolite to zeolite. Variations in pore dimensions and shapes cause variations in the adsorptive and catalytic properties of the zeolites. Only molecules of certain dimensions and shapes are able to fit into the pores of a particular zeolite while other molecules of larger dimensions or different shapes are unable to penetrate the zeolite crystals.

Because of their unique molecular sieving characteristics, as well as their potentially acidic nature, zeolites are especially useful in hydrocarbon processing as adsorbents, and, as catalysts, for cracking, reforming, and other hydrocarbon conversion reactions. Although many different crystalline aluminosilicates have been prepared and tested, the search continues for new zeolites which can be used in hydrocarbon and chemical processing.

I have discovered a novel family of crystalline aluminosilicate zeolites, hereafter called "Zeolite SSZ-15" or simply "SSZ-15", and methods for its preparation and use.

In recent years, many crystalline aluminosilicates having desirable adsorption and catalytic properties have been prepared. Typically, zeolites are prepared from reaction mixtures having sources of alkali or alkaline earth metal oxides, silica, and alumina. More recently, "nitrogenous zeolites" have been prepared from reaction mixtures containing an organic species, usually a nitrogen compound. Depending upon the reaction conditions and the composition of the reaction mixture, different zeolites can be formed even if the same organic species are used. For example, zeolites ZK-4, ZSM-4, faujasite and PHI, have all been prepared from tetramethylammonium solutions.

Although most experiments reported as producing nitrogenous zeolites have used fairly simple organic species such as tetra(n-alkyl)ammonium cations or alkylenediamines, several experiments are reported as using other organic species. U.S. Pat. No. 3,692,470, Ciric, Sept. 19, 1972, discloses preparing ZSM-10 from 1,4-dimethyl-1,4-diazoniabicyclo[2.2.2.]octane. U.S. Pat. No. 3,783,124, Rubin et al., Jan. 1, 1974 discloses preparing a zeolite from benzyl trimethylammonium compounds. U.S. Pat. No. 3,832,449, Rosinski et al., Aug. 27, 1974, discloses preparing ZSM-12 from the reaction products of alkylene dihalides with complex amines or nitrogen heterocycles. U.S. Pat. No. 3,950,496, Ciric, Apr. 13, 1976, discloses preparing ZSM-18 from "tris" ammonium hydroxide (1,3,4,6,7,9-hexahydro-2,2,5,5,8,8-hexamethyl-2H-benzo[1,2-C:3,4-C':5,6-C"]tripyrolium trihydroxide). U.S. Pat. No. 4,000,248, Martin, Dec. 28, 1976 discloses preparing ferrierite using N-methylpyridine. U.S. Pat. No. 4,018,870, Whittam, Apr. 19, 1977, discloses preparing AG5 and AG6 using nitrogenous basic dyes. U.S. Pat No. 4,251,499, Nanne, Feb. 17, 1981 discloses preparing ferrierite using piperidine or alkyl substituted piperidine. And, U.S. Pat. No. 4,285,922, Audeh, Aug. 25, 1981, discloses preparing ZSM-5 using 1-alkyl, 4 aza, 1-azonia-bicyclo[2.2.2]octane, 4-oxide halides.

TECHNICAL DISCLOSURE

My invention is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1. The zeolite further has a composition, as synthesized and in the anhydrous state, in terms of mole ratios of oxides, as follows: (0.5 to 1.4)$R_2O$:(0 to 0.50)$M_2O$:$W_2O_3$:(greater than 5)$YO_2$ wherein M is an alkali metal cation, W is selected from aluminum, gallium, and mixtures thereof, Y is selected from silicon, germanium and mixtures thereof, and R is an organic cation.

SSZ-15 zeolites can have a $YO_2$:$W_2O_3$ mole ratio greater than about 5:1. As prepared, the silica:alumina mole ratio is typically above about 50:1. Since aluminum need not be used in the reaction mixture, the zeolite can be prepared in essentially aluminum free form as silica polymorphs having silica:alumina mole ratios greater than 1000:1. The silica:alumina mole ratio of the SSZ-15 zeolites can be increased by using standard acid leaching or chelating treatments and by using silicon and carbon halides and similar compounds. Preferably, for catalytic use, SSZ-15 is an aluminosilicate wherein W is aluminum and Y is silicon.

My invention also involves a method for preparing SSZ-15 zeolites, comprising preparing an aqueous mixture containing sources of an organic nitrogen-containing compound, an oxide selected from aluminum oxide, gallium oxide, and mixtures thereof, and an oxide selected from silicon oxide, germanium oxide, and mixtures thereof, and having a composition, in terms of mole ratios of oxides, falling within the following ranges: $W_2O_3/YO_2$, 1:5 to 0:1; $R_2O/W_2O_3$ 0.5:1 to 40:1; and $OH^-/SiO_2$ less than about 0.95:1; wherein Y is selected from silicon, germanium, and mixtures thereof, W is selected from aluminum, gallium and mixtures thereof, and R is an organic cation; maintaining the mixture at a temperature of at least 100° C. until the crystals of said zeolite are formed; and recovering said crystals.

SSZ-15 zeolites have a crystalline structure whose X-ray powder diffraction pattern shows the following characteristic lines:

TABLE 1

| 2 $\phi$ | d/n | Relative Intensity |
|---|---|---|
| 7.96 | 11.10 | 15 |
| 9.59 | 9.22 | 31 |
| 19.17 | 4.63 | 59 |
| 19.86 | 4.47 | 22 |
| 20.61 | 4.31 | 100 |
| 22.28 | 3.99 | 39 |
| 23.60 | 3.77 | 11 |
| 24.05 | 3.70 | 17 |
| 24.84 | 3.59 | 20 |
| 25.98 | 3.43 | 6 |
| 26.61 | 3.35 | 20 |
| 27.27 | 3.27 | 28 |
| 29.78 | 3.00 | 6 |

Typical SSZ-15 aluminosilicate zeolites as synthesized have the X-ray diffraction patterns of Tables 4–7.

The X-ray powder diffraction patterns were determined by standard techniques. The radiation was the K-alpha/doublet of copper and a scintillation counter spectrometer with a strip-chart pen recorder was used. The peak heights I and the positions, as a function of 2 $\theta$ where $\theta$ is the Bragg angle, were read from the spectrometer chart. From these measured values, the relative intensities, $100I/I_0$, where $I_0$ is the intensity of the strongest line or peak, and d, the interplanar spacing in Angstroms corresponding to the recorded lines, can be calculated. The X-ray diffraction pattern of Table 1 is characteristic of SSZ-15 zeolites. The zeolite as synthesized or as produced by exchanging the metal or other cations present in the zeolite with various other cations yields substantially the same diffraction pattern although there can be minor shifts in interplanar spacing and minor variations in relative intensity. Minor variations in the diffraction pattern can also result from varying the organic compound used in the preparation and from variations in the silica-to-alumina mole ratio from sample to sample. Calcination can also cause minor shifts in the X-ray diffraction pattern. Notwithstanding these minor perturbations, the basic crystal lattice structure remains unchanged.

SSZ-15 zeolites can be suitably prepared from an aqueous solution containing sources of an alkali metal oxide, an organic compound, an oxide of aluminum or gallium, or mixture of the two, and an oxide of silicon or germanium, or mixture of the two. The reaction mixture should have a composition in terms of mole ratios of oxides falling within the following ranges:

|  | Broad | Preferred |
| --- | --- | --- |
| $W_2O_3/YO_2$ | 0–0.2 | 0.0005–0.02 |
| $M_2O/W_2O_3$ | 0.5–20 | 1–17 |
| $R_2O/W_2O_3$ | 0.5–40 | 5–25 |
| $OH^-/YO_2$ | <0.95 | <0.40 | wherein R is as disclosed below, Y is silicon, germanium or both, and W is aluminum, gallium or both. M is an alkali metal, preferably sodium. Typically, an alkali metal hydroxide is used in the reaction mixture; however, this component can be omitted so long as the equivalent basicity is maintained. The organic compound can provide hydroxide ion.

"Essentially alumina free", as used herein, is meant the product, a silica polymorph having the SSZ-15 lattice structure (or essentially alumina-free silicaceous crystalline molecular sieve), has a silica:alumina mole ratio of greater than 200:1, preferably greater than 500:1, and more preferably greater than 1000:1. The term "essentially alumina free" is used because it is difficult to prepare completely aluminum free reaction mixtures for synthesizing these materials. Especially when commercial silica sources are used, aluminum is almost always present to a greater or lesser degree. The hydrothermal reaction mixtures from which the essentially alumina free crystalline silicaceous molecular sieves are prepared can also be referred to as being substantially aluminum free. By this usage is meant that no aluminum is intentionally added to the reaction mixture, e.g., as an alumina or aluminate reagent, and that to the extent aluminum is present, it occurs only as a contaminant in the reagents.

The organic component of the crystallization mixture is typically a cycloalkyl trimethyl heteroatom compound. The heteroatom can be nitrogen or phosphorus. The preferred organic species are sources of cyclohexyl trimethylammonium cations and cyclopentyl trimethylammonium cations. The cyclopentyl trimethylammonium cation sources are especially preferred.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium and germanium can be added in forms corresponding to their aluminum and silicon counterparts. Salts, particularly alkali metal halides such as sodium chloride, can be added to or formed in the reaction mixture. They are disclosed in the literature as aiding the crystallization of zeolites while preventing silica occlusion in the lattice.

The reaction mixture is maintained at an elevated temperature until the crystals of the zeolite are formed. The temperatures during the hydrothermal crystallization step are typically maintained from about 100° C. to about 235° C., preferably from about 120° C. to about 200° C. and most preferably from about 135° C. to about 165° C. The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, SSZ-15 zeolite crystals. The drying step can be performed at atmospheric or subatmospheric pressures.

During the hydrothermal crystallization step, the SSZ-15 crystals can be allowed to nucleate spontaneously from the reaction mixture. The reaction mixture can also be seeded with SSZ-15 crystals both to direct, and accelerate the crystallization, as well as to minimize the formation of undesired aluminosilicate contaminants. If the reaction mixture is seeded with SSZ-15 crystals, the concentration of the organic compound can be greatly reduced or eliminated, but it is preferred to have some organic compound present, e.g., an alcohol.

The synthetic SSZ-15 zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the SSZ-15 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The SSZ-15 aluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be calcined, treated with acid, or chemically modified.

In addition to the foregoing materials, the SSZ-15 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-15 zeolites can also be composited with other zeolites such as synthetic and natural faujasites (e.g., X and Y), erionites, and mordenites. They can also be composited with purely synthetic zeolites such as ZSM-5. The combination of zeolites can also be composited in a porous inorganic matrix.

SSZ-15 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., ortho xylene), and disproportionating aromatics (e.g., toluene) to provide mixtures of benzene, xylenes and higher methylbenzenes. The SSZ-15 catalysts have high selectivity, and under hydrocarbon conversion conditions can provide a high percentage of desired products relative to total products.

SSZ-15 zeolites can be used in processing hydrocarbonaceous feedstocks. Hydrocarbonaceous feedstocks contain carbon compounds. They can be from many different sources, such as virgin petroleum fractions, recycle petroleum fractions, shale oil, liquefied coal, tar sand oil, and, in general, can be any carbon containing fluid susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general the processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Using SSZ-15 catalysts which contain hydrogenation components, heavy petroleum residual stocks, cycle stocks, and other hydrocrackable charge stocks can be hydrocracked at temperatures from 175° C. to 485° C. using molar ratios of hydrogen to hydrocarbon charge from 1 to 100. The pressure can vary from 0.5 to 350 bar and the liquid hourly space velocity from 0.1 to 30. For these purposes, the SSZ-15 catalyst can be composited with mixtures of inorganic oxide supports as well as with faujasites such as X and Y.

Hydrocarbon cracking stocks can be catalytically cracked using SSZ-15 at liquid hourly space velocities from 0.5 to 50, temperatures from about 260° F. to 625° F., and pressures from subatmospheric to several hundred atmospheres.

SSZ-15 can be used to dewax hydrocarbonaceous feeds by selectively removing straight chain paraffins. The process conditions can be those of hydrodewaxing, a mild hydrocracking, or they can be at lower pressures in the absence of hydrogen. Dewaxing in the absence of hydrogen at pressures less than 30 bar, and preferably less than 15 bar, is preferred as significant amounts of olefins can be obtained from the cracked paraffins.

SSZ-15 can also be used in reforming reactions using temperatures from 315° C. to 595° C., pressures from 30 to 100 bar, and liquid hourly space velocities from 0.1 to 20. The hydrogen to hydrocarbon mole ratio can be generally from 1 to 20.

The catalyst can also be used to hydroisomerize normal paraffins, when provided with a hydrogenation component, e.g., platinum. Hydroisomerization is carried out at temperatures from 90° C. to 370° C., and liquid hourly space velocities from 0.01 and 5. The hydrogen to hydrocarbon mole ratio is typically from 1:1 to 5:1. Additionally, the catalyst can be used to isomerize and polymerize olefins using temperatures from 0° C. to 260° C.

Other reactions which can be performed using the catalyst of this invention containing metals such as platinum, include hydrogenation-dehydrogenation, denitrogenation, and desulfurization reactions.

SSZ-15 can be used in hydrocarbon conversion reactions with active or inactive supports, with organic or inorganic binders, and with and without added metals. These reactions are well known to the art, as are the reaction conditions.

SSZ-15 can also be used as an adsorbent, a filler in paint and paper products, and a water-softening agent in detergents.

The examples illustrate my invention without limiting it.

FIGURE

FIG. 1 illustrates the X-ray diffraction pattern of a typical SSZ-15 zeolite.

EXAMPLES

Example 1

Synthesis of Template Molecule

Cyclopentylamine, 17 g (0.2 moles), was dissolved in 170 ml of dimethylformamide at room temperature. Tributylamine, 74 g (0.4 moles), was added as an acid acceptor. Methyl iodide, 85 g (0.6 moles), was added dropwise while the reaction mixture was cooled in an ice bath. The reaction mixture was allowed to come to room temperature over several hours; crystals were observed in solution. Chilling the solution, and then finally adding acetone and then ether, produced still more product. The product was identified as N,N,N-trimethylcyclopentyl ammonium iodide by melting point and by microanalysis.

Cyclohexyl trimethylammonium iodide can be prepared by a similar process, but using cyclohexylamine in place of cyclopentylamine.

Example 2

The following procedure illustrates the preparation of SSZ-15, using cyclopentyl trimethylammonium iodide as the organic templating species.

A first solution was prepared by adding 4.5 g of sodium silicate solution (29% $SiO_2$, 9% $Na_2O$), 5.6 ml of $H_2O$, and 2.2 g of cyclopentyl trimethylammonium iodide. A second solution prepared using 0.16 g of $Al_2(SO_4)_3.16H_2O$ and 0.38 g of concentrated $H_2SO_4$ dissolved in 7.7 ml of water was added to the first solution while stirring. The gel which formed was placed in a 23 ml Teflon cup designed to fit into a stainless steel pressure reactor (Parr Chemical Co.). The pH was adjusted to 10.50±0.05 with concentrated NaOH. The reactor was closed, placed upon a rotating rack (45 rpm), and heated for 4 days at 150° C. and autogenous pressure. Rotating the reactor stirred the reaction mixture. Upon cooling, the contents of the Teflon cup were poured into a filter and the resulting solids were washed five times with distilled $H_2O$. The as synthesized zeolite was recovered.

The zeolite was calcined under nitrogen in a stepped temperature cycle for 3 hours at 200° F. (93° C.), 2 hours at 400° F. (204° C.), 2 hours at 600° F. (316° C.), 2 hours at 800° F. (427° C.) and 2½ hours at 940° F. (504° C.). Small amounts of air were admitted to the nitrogen stream beginning at 600° F. (316° C.).

The zeolite was then ion-exchanged three times with an ammonium salt. In each ion exchange treatment, a molar excess of $NH_4+$ to zeolite acid sites was used. A mixture of 25 ml saturated ammonium solution per 0.5 g zeolite was prepared. The mixture was then heated to 100° C. in a closed system for 2–4 hours. After drying the zeolite after the third exchange treatment, it was recalcined using the stepped temperature program.

The X-ray diffraction pattern of the product is shown in Table 2.

TABLE 2

| 2 φ | d/n | Relative Intensity |
|---|---|---|
| 7.92 | 11.16 | 37 |
| 9.55 | 9.26 | 63 |
| 11.75 | 7.53 | 5 |
| 12.96 | 6.83 | 8 |
| 14.86 | 5.96 | 8 |
| 15.25 | 5.81 | 8 |
| 19.22 | 4.62 | 74 |
| 19.86 | 4.47 | 26 |
| 20.62 | 4.31 | 100 |
| 21.86 | 4.07 | 11 |
| 22.30 | 3.99 | 40 |

Examples 3–10

Using the procedure of Example 2, a series of experiments was performed to make SSZ-15. The quantities of reactants used and the products are given in Table 3.

TABLE 3

| | Example | | | | | | | |
|---|---|---|---|---|---|---|---|---|
| | 3 | 4 | 5 | 6 | 7 | 8 | 9 | 10 |
| Solution 1 | | | | | | | | |

TABLE 3-continued

| | Example | | | | | | | |
|---|---|---|---|---|---|---|---|---|
| | 3 | 4 | 5 | 6 | 7 | 8 | 9 | 10 |
| Sodium Silicate, g | 4.5 | 4.5 | 4.5 | 4.5 | 4.5 | — | — | — |
| Ludox AS-30, g | — | — | — | — | — | 22 | 22 | 50 |
| H$_2$O, ml | 5.6 | 5.6 | 5.6 | 5.6 | 5.6 | 50 | 50 | 19 |
| Template, g | 2.2 | 2.2 | 2.2 | 1.0 | 1.0 | 1.0 | 8 | 12.65 |
| Solution 2 | | | | | | | | |
| H$_2$O, ml | 7.7 | 7.7 | 7.7 | 7.7 | 7.7 | 12.5 | 12.5 | — |
| Al$_2$(SO$_4$)$_3$·16H$_2$O, g | 0.08 | 0.16 | 0.00 | 0.16 | 0.16 | — | — | — |
| NaAlO$_2$, g | — | — | — | — | — | 0.23 | 0.23 | 1.92 |
| Conc. H$_2$SO$_4$, g | 0.38 | 0.38 | 0.38 | 0.38 | 0.38 | — | — | — |
| Conc. NaOH, g | 0.08 | — | 0.08 | 0.08 | — | 1.20 | 1.20 | 4.00 |
| Time, days | 4 | 4 | 4 | 4 | 6 | 3 | 3 | 3 |
| Temperature, °C. | 150 | 150 | 150 | 150 | 150 | 200 | 200 | 180 |
| Stirring | 45 rpm | 45 rpm | 45 rpm | 45 rpm | 45 rpm | — | — | — |
| SiO$_2$/Al$_2$O$_3$ mole ratio in reaction mixture | 160:1 | 80:1 | "Al free" | 80:1 | 80:1 | 600:1 | 600:1 | 200:1 |
| Product | SSZ-15 | SSZ-15 | SSZ-15 50% + 50% magadite | SSZ-15 | SSZ-15 | SSZ-15 + Quartz | SSZ-15 | SSZ-15 + Quartz |

X-ray diffraction patterns of the as synthesized zeolite product are given in Tables 4–7.

TABLE 4

Pattern for Example 4

| 2φ | d/n | Intensity | 100 × I/Io |
|---|---|---|---|
| 8.00 | 11.05 | 6 | 11 |
| 9.62 | 9.19 | 14 | 26 |
| 11.72 | 7.55 | 2 | 4 |
| 12.95 | 6.84 | 1 | 2 |
| 14.20 | 6.24 | 1 | 2 |
| 14.85 | 5.97 | 1 | 2 |
| 15.25 | 5.81 | 1 | 2 |
| 19.21 | 4.62 | 31 | 52 |
| 19.88 | 4.46 | 11 | 20 |
| 20.66 | 4.30 | 54 | 100 |
| 22.30 | 3.99 | 22 | 41 |
| 23.65 | 3.76 | 6 | 11 |
| 24.12 | 3.69 | 8 | 15 |
| 24.86 | 3.58 | 12 | 22 |
| 26.00 | 3.43 | 3 | 6 |
| 26.63 | 3.35 | 11 | 20 |
| 27.25 | 3.27 | 16 | 30 |
| 28.55 | 3.13 | 4 | 7 |
| 28.68 | 3.11 | 2 | 4 |
| 29.00 | 3.08 | 2 | 4 |
| 29.75 | 3.00 | 3 | 6 |

TABLE 5

Pattern for Example 7

| 2φ | d/n | Intensity | 100 × I/Io |
|---|---|---|---|
| 7.95 | 11.12 | 7 | 12 |
| 9.55 | 9.26 | 15 | 25 |
| 11.65 | 7.60 | 2 | 3 |
| 12.80 | 6.92 | 1 | 2 |
| 14.07 | 6.29 | 1 | 2 |
| 14.80 | 5.99 | 1 | 2 |
| 15.13 | 5.86 | 1 | 2 |
| 19.10 | 4.65 | 29 | 49 |
| 19.80 | 4.48 | 14 | 24 |
| 20.55 | 4.32 | 59 | 100 |
| 22.20 | 4.00 | 21 | 36 |
| 23.55 | 3.78 | 6 | 10 |
| 24.00 | 3.71 | 9 | 15 |
| 24.75 | 3.60 | 10 | 17 |
| 25.95 | 3.43 | 3 | 5 |
| 26.55 | 3.36 | 10 | 17 |
| 27.20 | 3.28 | 13 | 22 |
| 28.60 | 3.12 | 2 | 3 |
| 29.00 | 3.08 | 2 | 3 |
| 29.70 | 3.01 | 3 | 5 |

TABLE 6

Pattern for Example 8

| 2φ | d/n | Intensity | 100 × I/Io |
|---|---|---|---|
| 8.00 | 11.05 | 5 | 13 |
| 9.61 | 9.20 | 12 | 30 |
| 11.73 | 7.55 | 1 | 3 |
| 12.91 | 6.86 | 1 | 3 |
| 14.20 | 6.24 | 1 | 3 |
| 14.85 | 5.97 | 1 | 3 |
| 15.24 | 5.81 | 1 | 3 |
| 19.22 | 4.62 | 22 | 55 |
| 19.85 | 4.47 | 7 | 18 |
| 20.63 | 4.31 | 40 | 100 |
| (20.88) | (4.25) | (17) | — |
| 22.32 | 3.98 | 15 | 38 |
| 23.65 | 3.76 | 4 | 10 |
| 24.08 | 3.70 | 6 | 15 |
| 24.90 | 3.58 | 8 | 20 |
| 26.02 | 3.42 | 2 | 5 |
| (26.70) | (3.34) | (100+) | — |
| 27.28 | 3.27 | 12 | 30 |
| 27.57 | 3.24 | 4 | 10 |
| 28.65 | 3.12 | 2 | 5 |
| 29.00 | 3.08 | 1 | 3 |
| 29.80 | 3.00 | 2 | 5 |

Figures in parentheses are diffraction peaks attributed to quartz.

TABLE 7

Pattern for Example 9

| 2φ | d/n | Intensity | 100 × I/Io |
|---|---|---|---|
| 8.00 | 11.05 | 8 | 10 |
| 9.57 | 9.24 | 20 | 26 |
| 11.67 | 7.58 | 2 | 3 |
| 12.90 | 6.86 | 2 | 3 |
| 14.15 | 6.26 | 1 | 1 |
| 14.85 | 5.97 | 1 | 1 |
| 15.22 | 5.82 | 1 | 1 |
| 19.17 | 4.63 | 42 | 55 |
| 19.85 | 4.47 | 16 | 21 |
| 20.64 | 4.30 | 77 | 100 |
| 22.28 | 3.99 | 32 | 42 |
| 23.60 | 3.77 | 7 | 9 |
| 24.10 | 3.69 | 11 | 14 |
| 24.83 | 3.59 | 15 | 19 |
| 26.00 | 3.43 | 4 | 5 |
| 26.62 | 3.35 | 14 | 18 |
| 27.25 | 3.27 | 20 | 26 |
| 27.52 | 3.24 | 7 | 9 |
| 28.67 | 3.11 | 3 | 4 |
| 29.00 | 3.08 | 2 | 3 |
| 29.70 | 3.01 | 3 | 4 |

Surface area measurements and element ratio determinations were carried out on samples from Example 4 after converting the zeolite into its acidic form. The conversion was achieved by first calcining the zeolite under $N_2$ in a stepped temperature cycle for 3 hours at 200° F. (93° C.), 2 hours at 400° F. (204° C.), 2 hours at 600° F. (316° C.), 2 hours at 800° F. (427° C.), and finally 2½ hours at 940° F. (504° C.). Small amounts of air were admitted to the nitrogen stream beginning at 600° F. (316° C.). Next, the zeolite was ion exchanged three times with $NH_4^+$ cation. In each ion exchange treatment, a molar excess of $NH_4^+$ to zeolite acid sites was used. A mixture of 25 ml saturated ammonium solution per 0.5 g zeolite was prepared, followed by heating the mixture to 100° C. in a closed system for 2 to 4 hours. After drying the zeolite after the third exchange treatment, it was calcined using the stepped temperature program described above.

Surface areas were determined using a Micromiretics Digisorb with $N_2$ as the adsorbate; values were calculated from the BET equation. $SiO_2/Al_2O_3$ ratios, and percent $Na_2O$ were determined by electron microprobe analysis.

The measured surface area was 28 m²/g. The zeolite samples were a dirty brown color indicating that the calcining coked the catalyst and did not remove the templating cation completely.

Example 11

Although SSZ-15, as synthesized, can be calcined using standard procedures, the organic templating species appears to be incompletely removed from the lattice; the calcining appears to deposit coke inside the lattice. The result is a zeolite with lower effective surface areas and pore volumes for catalysis. Procedures other than ordinary calcining can be used to remove the organic species from the lattice.

A sample of the product of Example 4 was stirred in 30% hydrogen peroxide solution for 2.5 days at room temperature. The material was washed several times with distilled water and dried. Then, the sample was calcined over a 10 hour period with the calcining temperature rising from 93° C. to 538° C.; the final temperature of 538° C. was maintained for 2.5 hours. The calcining atmosphere was low partial pressure oxygen (a mixture of 40% air and 60% pure nitrogen).

The surface area of the product was 45 m²/g as compared to 28 m²/g when the sample was calcined without hydrogen peroxide soaking or oxygen control. The X-ray diffraction pattern was substantially unchanged, even after the zeolite was heated further at 704° C.

Example 12

A sample of Example 4 was treated for 4 days at room temperature in a low temperature asher which generates active oxygen atoms (ozone) for oxidizing organic substrates. After calcining the product, followed by ion-exchanging with $NH_4NO_3$ and re-calcining, the zeolite's surface area was increased and was 38 m²/g.

Example 13

The SSZ-15 product of Example 13 was impregnated to 1 wt % Pt. The Pt-SSZ-15 zeolite was tested for hydrocracking activity using an n-hexadecane feed, 1000 psi $H_2$, 800° F. (427° C.), and LHSV of 5 (based on mass). Conversion was 78%. The iso/normal product mole ratios showed that the zeolite had shape selectivity and pore size constraints:

| | |
|---|---|
| isoC$_4$/nC$_4$ | 0.73 |
| isoC$_5$/nC$_5$ | 0.51 |
| 2,2-dimethylbutane/nC$_6$ | 0.02 |
| 2,3-dimethylbutane/nC$_6$ | 0.02 |
| 2-methylpentane/nC$_6$ | 0.39 |
| 3-methylpentane/nC$_6$ | 0.24 |

What is claimed is:

1. A zeolite having a composition, as synthesized and in the anhydrous state, in terms of mole ratios of oxides as follows: (0.5 to 1.0)$R_2O$:(0 to 0.50)$M_2O$:$W_2O_3$:(greater than 5) $YO_2$ wherein M is an alkali metal cation, W is selected from aluminum, gallium and mixtures thereof, Y is selected from silicon, germanium and mixtures thereof, R is an organic nitrogen cation, selected from the group consisting of cyclopentyl trimethylammonium and cyclohexyl trimethylammonium cations, and having the X-ray diffraction lines of Table 1.

2. A method for preparing the zeolite of claim 1, comprising:
   (a) preparing an aqueous mixture containing sources of an organonitrogen compound, an oxide selected from aluminum oxide, gallium oxide, and mixtures thereof, and an oxide selected from silicon oxide, germanium oxide, and mixtures thereof, the aqueous mixture having the following composition in terms of mole ratio of oxides:
   $W_2O_3/YO_2 = 0–0.2$
   $M_2O/W_2O_3 = 0.5–20$
   $R_2O/W_2O_3 = 0.5–40$
   wherein R is an organonitrogen cation selected from the group consisting of cyclopentyl trimethylammonium cation and cyclohexyl trimethylammonium cation, Y is silicon, germanium or mixtures thereof, W is aluminum, gallium or mixtures thereof, and M is an alkali metal, wherein said aqueous mixture has a mole ratio of $OH^-$:$SiO_2$ of less than about 0.95:1;
   (b) maintaining the mixture at a temperature of at least 100° C. until the crystals of said zeolite form; and
   (c) recovering said crystals.

3. The method according to claim 2 wherein the aqueous mixture has a composition in terms of mole ratios of oxides falling in the ranges: $YO_2/W_2O_3$, 5:1 to 350:1; $R_2O/W_2O_3$, 0.5:1 to 40:1; wherein Y is selected from silicon, germanium and mixtures thereof, W is selected from aluminum, gallium, and mixtures thereof, and R is an organonitrogen cation selected from the group consisting of cyclopentyl trimethylammonium cations and cyclohexyl trimethylammonium cations.

* * * * *